United States Patent
Park et al.

(10) Patent No.: US 8,831,280 B2
(45) Date of Patent: Sep. 9, 2014

(54) 3D MOTION RECOGNITION METHOD AND APPARATUS

(75) Inventors: Jun Seok Park, Daejeon (KR); Eunjin Koh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 363 days.

(21) Appl. No.: 13/315,968

(22) Filed: Dec. 9, 2011

(65) Prior Publication Data

US 2012/0148097 A1     Jun. 14, 2012

(30) Foreign Application Priority Data

Dec. 14, 2010    (KR) ......................... 10-2010-0127564

(51) Int. Cl.
*G06K 9/00*     (2006.01)

(52) U.S. Cl.
USPC ........................................................ 382/103

(58) Field of Classification Search
None
See application file for complete search history.

(56) References Cited

U.S. PATENT DOCUMENTS 7,590,262 B2    9/2009   Fujimura et al.

FOREIGN PATENT DOCUMENTS

| KR | 10-0919166 | 10/2008 |
|---|---|---|
| KR | 10-0899422 | 2/2009 |
| KR | 10-0951637 | 6/2009 |
| KR | 10-2010-0112840 | 10/2010 |

OTHER PUBLICATIONS

Hatzitheodorou, M., et al. "Stereo matching using optic flow." Real-Time Imaging 6.4 (2000): 251-266.*
Inoue, Hirochika, Tetsuya Tachikawa, and Masayuki Inaba. "Robot vision system with a correlation chip for real-time tracking, optical flow and depth map generation." Robotics and Automation, 1992. Proceedings., 1992 IEEE International Conference on. IEEE, 1992.*

* cited by examiner

*Primary Examiner* — Stephen R Koziol
*Assistant Examiner* — Raphael Schwartz
(74) *Attorney, Agent, or Firm* — Staas & Halsey LLP

(57) ABSTRACT

Disclosed are a three-dimensional motion recognition method and an apparatus using a motion template method and an optical flow tracking method of feature points. The three dimensional (3D) motion recognition method through feature-based stereo matching according to an exemplary embodiment of the present disclosure includes: obtaining a plurality of images from a plurality of cameras; extracting feature points from a single reference image; and comparing and tracking the feature points of the reference image and another comparison image photographed at the same time using an optical flow method.

11 Claims, 5 Drawing Sheets
(3 of 5 Drawing Sheet(s) Filed in Color)

Frame-0    Frame-35    Frame-70    MHI

3D MOTION RECOGNITION METHOD AND APPARATUS

CROSS-REFERENCE TO RELATED APPLICATIONS

This application is based on and claims priority from Korean Patent Application No. 10-2010-0127564, filed on Dec. 14, 2010, with the Korean Intellectual Property Office, the present disclosure of which is incorporated herein in its entirety by reference.

TECHNICAL FIELD

The present disclosure relates to a three-dimensional motion recognition method and apparatus using a stereo matching method. More particularly, the present disclosure relates to a feature-based stereo matching method and apparatus capable of finding feature points in a reference image and tracking the same locations in comparison images to obtain binocular disparity.

BACKGROUND

Generally, stereo matching means obtaining an accurate and reliable disparity map by estimating disparity between corresponding points between two images obtained at different viewpoints by using the same method as a method of recognizing a distance of an object through two human eyes.

In addition, a three-dimensional image having depth perception can be recovered by generating a depth map using the above-mentioned disparity map. The stereo matching method may be largely classified into an area-based method and a feature-based method. The feature-based method may be relatively free of several restrictions of the area-based method and may generate a more accurate and robust depth map, but has a limitation in generating a relatively sparse depth map. Therefore, a general stereo matching method may be changed according to applications; however, the area-based method capable of generating a dense depth map throughout the entire image is generally used.

However, the area-based method always needs a calibration process that matches an epi-polar line and needs calculation time longer than the feature-based method because it needs to calculate the depth value for the entire area of an image. In addition, under the assumption satisfying conditions in that a light source is to be a point light source at an infinite distance, an object in a scene is to be a Lambertian surface, and distortions of binocular color senses or features are to be relatively small, the stereo matching is performed.

SUMMARY

The present disclosure has been made in an effort to provide a feature-based stereo matching method that is free of the above-mentioned conditions assumed by an area-based method and may rapidly create a more accurate depth map by using minimum information without performing a calibration process for obtaining an epi-polar line.

An exemplary embodiment of the present disclosure provides a three dimensional (3D) motion recognition method through feature-based stereo matching, including: obtaining a plurality of images from a plurality of cameras; extracting feature points from a single reference image; and comparing and tracking the feature points of the reference image and another comparison image photographed at the same time using an optical flow method.

The plurality of cameras include a reference camera obtaining the reference image and a comparison camera obtaining the comparison image.

The optical flow method is capable of modifying a size and a shape of a window used in the optical flow method by using previous information.

The comparing of the feature points includes gradually reducing a resolution of the obtained image to create multiple levels of resolution and performing comparison from an image having the lowest resolution.

The comparing of the feature points may be performed by comparing the feature points of the reference image and the comparison image using gradient distribution in the vicinity of the feature points.

The comparing and tracking the feature points includes configuring a depth map according to an optical flow distance and comparing and tracking the feature points of the configured depth map.

The optical flow method is configured to find the feature points in each of the reference image and the comparison image, and track the feature points by applying the optical flow method in each direction.

The tracking the feature points further includes removing noise by using a motion template method in which an area that has movement is represented by a bright color and an area that does not have movement is represented by a dark color.

Another exemplary embodiment of the present disclosure provides a three dimensional (3D) motion recognition apparatus in an image processing apparatus through feature-based stereo matching, including: a plurality of cameras obtaining a plurality of images; a feature point extracting unit comparing and tracking the feature points of the reference image and another comparison image photographed at the same time using an optical flow method.

The feature point comparing and extracting unit is capable of modifying a size and a shape of a window used in the optical flow method by using previous information.

The feature point comparing and extracting unit compares the feature points of the reference image and the comparison image using gradient distribution in the vicinity of the feature points.

The feature point comparing and extracting unit configures a depth map according to an optical flow distance and compares and tracks the feature points of the configured depth map.

The feature point comparing and extracting unit removes noise by using a motion template method in which an area that has movement is represented by a bright color and an area that does not have movement is represented by a dark color.

According to the exemplary embodiments of the present disclosure, the feature-based stereo matching method is performed by using the optical flow method for the space rather than the time, such that it is not required to find the epi-polar line through a difficult calibration process and to perform rectification.

Further, even though the binocular color senses or brightness values are slightly different, features of both images may be accurately and stably tracked. Therefore, it is possible to directly perform stereo vision without conducting any adjustment process in a state in which two web cameras are disposed in parallel with each other.

In addition, since a performing speed is processed in real time, the present disclosure may be easily applied to several real-time applications.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The application file contains at least one drawing executed in color. Copies of this patent or patent application publication with color drawings will be provided by the Office upon request and payment of the necessary fee.

FIG. 6 is a reference view showing a case in which it is difficult to properly recognize a 3D motion of a user due to an influence of a background according to illumination such as a back light, or the like.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings.

A stereo matching method using an optical flow tracking method of feature points according to an exemplary embodiment of the present disclosure does not obtain an epi-polar line. Therefore, it is not required to control several complicated software and hardware in order to perform calibration. In addition, color senses or brightness values of images photographed in both eyes need not to coincide with each other. Since the stereo matching method according to the exemplary embodiment of the present disclosure is a feature-based method, a sparse depth map is created. However, the depth map is created to be enough to be used in several applications and the speed thereof is also calculated at a speed enough to be used in real time.

Figure 1:
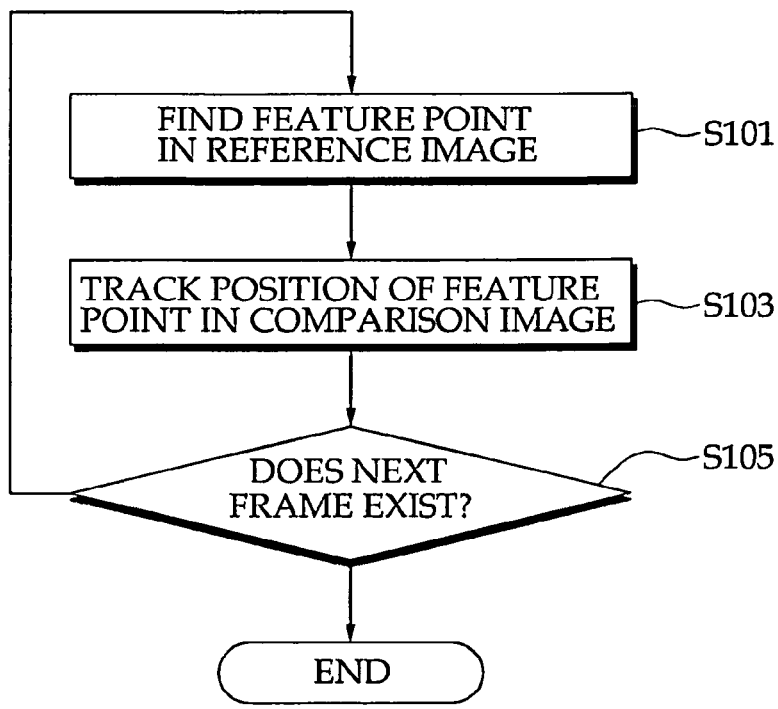
FIG. 1 is a diagram sequentially showing a feature-based stereo matching method according to an exemplary embodiment of the present disclosure.

FIG. 1 is a diagram sequentially showing a feature-based stereo matching method according to an exemplary embodiment of the present disclosure.

First, feature points at which an image may be properly tracked are found in a reference image (S101).

Then, positions of the feature points found in an operation (S101) are tracked in a comparison image by using an optical flow method (S103).

Next, when it is determined where or not there is a next frame and it is determined that there is a next frame, operations (S101 and S103) are repeatedly performed for each frame (S105).

Generally, the optical flow method is used in order to detect a movement direction of an image between neighboring frames from an image generated based on a time. For example, when a camera moves from the left to the right, a photographed image moves from the right to the left, which is sensed by using the optical flow method, thereby making it possible to estimate in what direction the camera is moving.

In most of the optical flow methods used in the stereo matching method according to the related art, stereo matching is performed using information obtained by applying optical flow according to a time to each of left and right images.

However, according to the exemplary embodiment of the present disclosure, an optical flow method is applied to a spatial order of the frame unlike the related art in which it is applied to a temporal order thereof.

Figure 2:
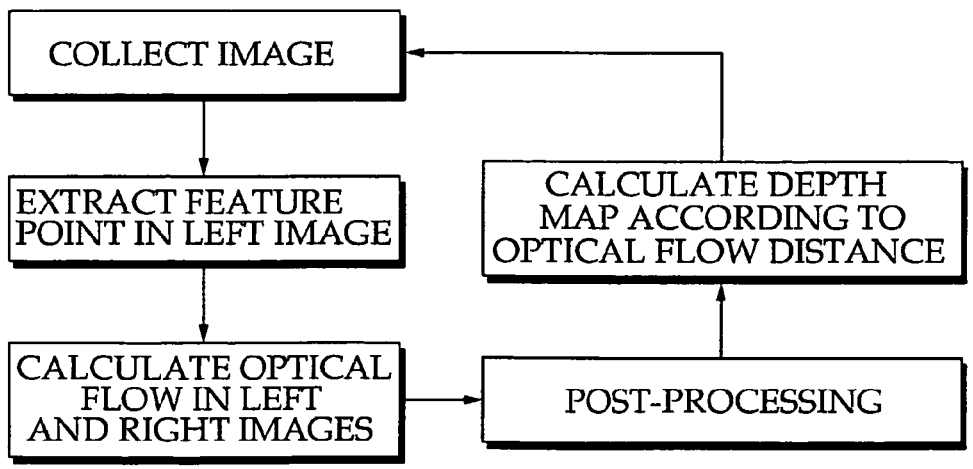
FIG. 2 is a diagram sequentially showing an optical flow tracking method of feature points according to an exemplary embodiment of the present disclosure.

FIG. 2 is a diagram sequentially showing an optical flow tracking method of feature points according to an exemplary embodiment of the present disclosure.

As shown in FIG. 2, an image is first collected, and feature points are extracted from a left image to calculate optical flows of left and right images. Then, post-processing is performed, and a depth map according to an optical flow distance is calculated. The above-mentioned operations are repeatedly performed for all frames.

In the optical flow method for the spatial order according to the exemplary embodiment of the present disclosure, reference and comparison images are images photographed in different viewpoints at the same time and contain the same object in substantial portions thereof. The reference and comparison images are the same as images photographed twice using a single camera at different positions in a state in which an object is stopped. In addition, since the object is stopped, the object photographed in both images may be assumed as a rigid body that does not have a change in shape. Therefore, it may be seen only that position translation is mainly generated and Affine transform is slightly generated in two images. Therefore, it is required to find good feature points in the reference image and properly track the good feature points in the comparison image.

For better understanding, as a simple example, assuming that a parallel camera model is used, when a distance from both images to a point tracked by the optical flow method is long, this point is a point that is at a place relatively close to the camera, and when the distance is short, this point is a point that is at a place relatively far away from the camera. However, a general optical flow method does not always ensure accurate tracking. For example, when the optical flow method is used in the case of performing photographing in a state in which the cameras are disposed at the left and the right, a case in which tracking is performed in a vertical direction is more frequently generated as compared to a case in which tracking is performed in a horizontal direction, in a vertically configured object. In this case, there may be a method of configuring a size of a window used in the optical flow so that a width and a height of the window is asymmetrical to each other or so that the tracking is performed only in the horizontal direction to some degree. However, according to an exemplary embodiment of the present disclosure, a process of tracking features of binocular images by a significantly strong and accurate method will be described.

In a general area-based stereo matching method, a brightness value of an image is used as it is. In this case, it is assumed that color senses and brightness values of the binocular images almost coincide with each other and there is almost no distortion between the binocular images. However, even though the same models of cameras are used, color senses may be slightly different in view of characteristics of each camera and much effort is required for completely synchronizing the color senses or the brightness values to each other. According to the exemplary embodiment of the present disclosure, since gradient distribution in the vicinity of the feature points rather than an absolute brightness value is used, even though there is a slight difference between the brightness values or the color senses of the binocular images, an operation may be performed without causing a large problem.

First, it is assumed that I and J are the reference image and the comparison image described above, respectively. In addition, it is assumed that $I(\vec{x})=I(x,y)$ and $J(\vec{x})=J(x,y)$ are brightness values in x and y coordinates of the image, respectively.

Tracking of the feature points with respect to a single point $u=[u_x u_y]^T$ in I, which is the reference image means that $v=u+d=[u_x+d_x, u_y+d_y]^T$ having J(v) similar to I(u) in a second image is found. When is assumed that $w_x$ and $w_y$ are values relating to a size of a window, a difference d due to movement between two images indicates a difference in position at which e is minimized in the following Equation 1.

$$e(d) =$$ [Equation 1]

$$e(d_x, d_y) = \sum_{x=u_x-w_x}^{u_x+w_x} \sum_{y=u_y-w_y}^{u_y+w_y} (I(x, y) - J(x+d_x, y+d_y))^2$$

In order to find x and y at which e(d) is minimized in Equation 1, it is required to find a point satisfying the following Equation 2.

$$\frac{\partial e(d)}{\partial d} = [0\ 0]$$ [Equation 2]

When the above Equation 2 is developed, the following Equation 3 is obtained.

$$\frac{\partial e(d)}{\partial d} =$$ [Equation 3]

$$-2 \sum_{x=u_x-w_x}^{u_x+w_x} \sum_{y=u_y-w_y}^{u_y+w_y} (I(x, y) - J(x+d_x, y+d_y)) \left[\frac{\partial J}{\partial x} \frac{\partial J}{\partial y}\right]$$

However, when it is assumed that d is significantly smaller than the size of the window, the above Equation 3 may be developed as the following Equation 4 by Primary Taylor Series.

$$\frac{\partial e(d)}{\partial d} \approx$$ [Equation 4]

-continued $$-2 \sum_{x=u_x-w_x}^{u_x+w_y} \sum_{y=u_y-w_y}^{u_y+w_y} \left(I(x, y) - J(x, y) - \left[\frac{\partial J}{\partial x} \frac{\partial J}{\partial y}\right] d\right) \left[\frac{\partial J}{\partial x} \frac{\partial J}{\partial y}\right]$$

In Equation 4, $$\left[\frac{\partial J}{\partial x} \frac{\partial J}{\partial y}\right]$$

is only a gradient vector of an image.

Therefore, the definition such as the following Equation 5 may be made.

$$\nabla I = \begin{bmatrix} I_x \\ I_y \end{bmatrix} = \left[\frac{\partial J}{\partial x} \frac{\partial J}{\partial y}\right]^T$$ [Equation 5]

In addition, when it is assumed in Equation 4 that $\delta I(x,y) = I(x,y) - J(x,y)$, Equation 4 may be converted into Equation 6 and Equation 7.

$$\frac{1}{2} \frac{\partial e(d)}{\partial d} \approx \sum \sum (\nabla I^T d - \delta I) \nabla I^T$$ [Equation 6]

$$\frac{1}{2} \frac{\partial e(d)}{\partial d} \approx \sum \sum \left( \begin{bmatrix} I_x^2 & I_x I_y \\ I_x I_y & I_y^2 \end{bmatrix} d - \begin{bmatrix} \delta I I_x \\ \delta I I_y \end{bmatrix} \right),$$ [Equation 7]

Here, when it is assumed that $$G = \sum \sum \left( \begin{bmatrix} I_x^2 & I_x I_y \\ I_x I_y & I_y^2 \end{bmatrix} \right) \text{ and } b = \begin{bmatrix} \delta I I_x \\ \delta I I_y \end{bmatrix},$$

Equation 7 may be converted into the following Equation 8.

$$\frac{1}{2} \left[\frac{\partial e(d)}{\partial d}\right]^T \approx Gd - b$$ [Equation 8]

Therefore, Equation 8 is summarized as the following Equation 9 by Equation 2.

$$d_{opt} = G^{-1} b$$ [Equation 9]

Therefore, $$\frac{b}{G}$$

indicates an optimal d, and a point in an image I and a point in an image J have a difference corresponding to a difference $d_{opt}$ in movement between the two images.

Figure 3:
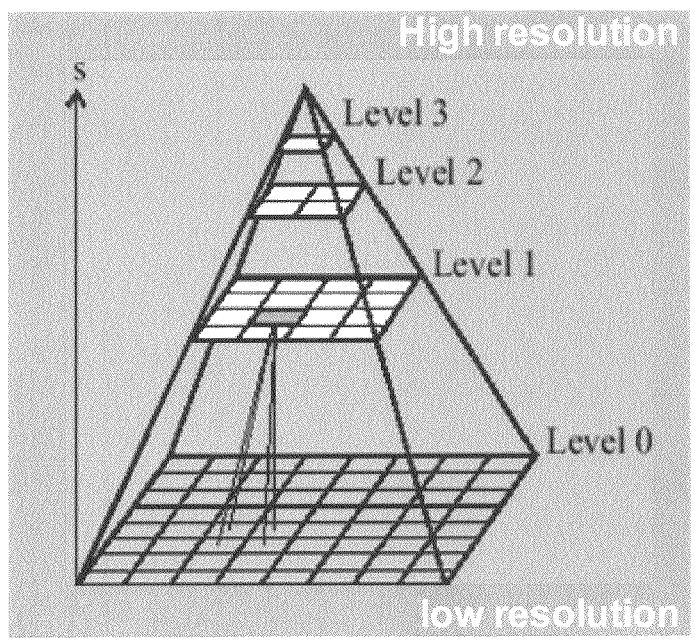
FIG. 3 is a reference diagram describing a process of gradually reducing a resolution of an image to create images having several resolutions and then performing matching from an image having the lowest resolution.

However, since the above Equations are equations using Taylor Series when d is sufficiently small, it is difficult to apply the above Equations to a case in which d is large. However, in the case of stereo matching, d mainly has a large value. Therefore, when a general optical flow method is directly applied to the stereo matching, accurate matching is not made. In order to complement this problem, a process of gradually reducing a resolution of an image to create images having several resolutions and then performing matching from an image having the lowest resolution is performed, as shown in FIG. 3.

When the resolution of the image is reduced, an effect that d is reduced accordingly is generated. Therefore, even though matching is performed using the optical flow method, a sufficient effect may be obtained. In addition, in order to obtain an optimal solution, the above Equations are repeated several times in consideration of a Newton-Raphson access method to find a close solution. The Newton-Raphson method is an estimation method that is slightly unstable but has a rapid conversion speed.

Generally, the feature-based stereo matching method has used an edge, a line, a corner, or the like, as a feature of an image. Even though it seems that the edge, the line, and the corner have a feature expected that they will be properly tracked, it may not be ensured that they are points properly tracked actually. Therefore, when it is assumed that the above-mentioned tracking method is used, it is advantageous in performing the tracking to select feature points appropriate for the tracking method described above rather than the edge, the line, and the corner listed above.

Viewing a G matrix, the G matrix is designed so that the tracking is properly performed when a small eigen value of the G matrix has a value as large as possible. Therefore, the feature point that is properly tracked by the above-mentioned method is a (x,y) position at which a small eigen value (generally, an eigen value has two values, and the smaller eigen value is an eigen value of the two values is large. Therefore, when eigen values at each position of the image are calculated and a desired number of feature points are arranged according to the order of large eigen values, each point may become a set of points having a large eigen value in the image. These points may be properly tracked by the above-mentioned method. A result thereof is shown in FIG. 4.

Figure 4:
FIG. 4 is a diagram showing creation of a feature-based depth map according to an exemplary embodiment of the present disclosure.

FIG. 4 is a diagram showing creation of a feature-based depth map according to an exemplary embodiment of the present disclosure. An original picture is shown in the left of FIG. 4, and a result obtained by tracking each feature point from the original picture is shown in the center thereof. Points represented by a black color are tracked as distant points, and points are tracked as closer points as they become bright. In addition, a depth map configured by using these points is shown in the right of FIG. 4. It may be appreciated that even though it seems that the result is configured of points, such that it is not accurate, the result is not so bad, considering that the result is obtained in real time under a bad condition in which two cameras of which epi-polar lines do not coincide with each other, rectifications are not performed, and any calibrations are not performed have slightly different color senses and brightness values. Therefore, interaction between a user and a computer may be sufficiently performed only with this accuracy.

FIG. 5 is a reference view showing a user computer interaction application according to an exemplary embodiment of the present disclosure.

In FIG. 5, post-processing is added to the results in FIG. 4 to track only real movement of the user. That is, the depth map by the feature points is created, a position of a head is found, and whether a hand stretched by the user is the left hand or the right hand is then estimated.

Figure 5A:
FIGS. 5A-5C are a reference view showing a user computer interaction application according to an exemplary embodiment of the present disclosure.
Figure 5B:
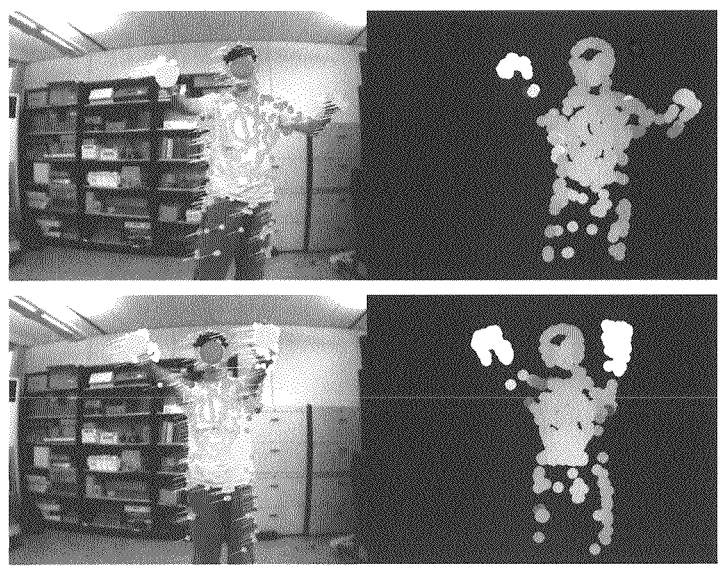
Figure 5C:

The estimated information may be directly applied to a fighting sporting game as shown in FIG. 5. FIG. 5A shows recognition of a kick, and FIG. 5B shows recognition of movement of a hand. FIG. 5C shows an example in which this information is applied to a fighting sporting game. As described above, since another portion of a body may also be estimated together with depth information, it may be applied to several applications.

Figure 6:

However, there is a case in which it is difficult to properly recognize 3D motion of the user due to an influence of a background according to illumination when backlight exists in a background behind the user as shown in FIG. 6.

Figure 7:
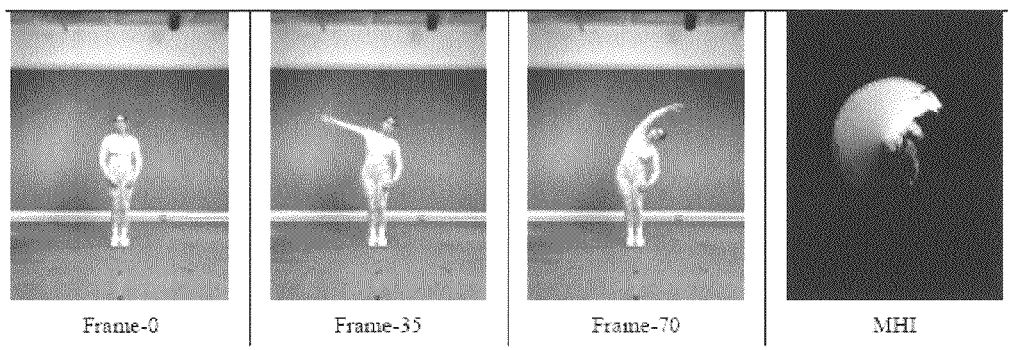
FIG. 7 is a reference diagram showing a case of using a motion template method.

In this case, in order to recognize stronger 3D motion, a motion template method as shown in FIG. 7 may be used.

FIG. 7 is a reference diagram showing a case of using a motion template method.

As shown in the rightmost view of FIG. 7, an area that has most recent movement is represented by a bright color, and an area that does not have movement is represented by a dark color. Since the motion of the user moves and the background is stopped, the stopped background is represented by a black color. Through the above-mentioned process, noise in the background may be effectively removed.

The above-mentioned optical flow tracking method is only an example and any optical flow tracking method may be used. According to the related art, generally, the optical flow method that is temporally applied is spatially applied to both images, thereby performing the stereo matching.

In addition, if minimum information is known, it may be used for performing more accurate tracking.

Figure 8:
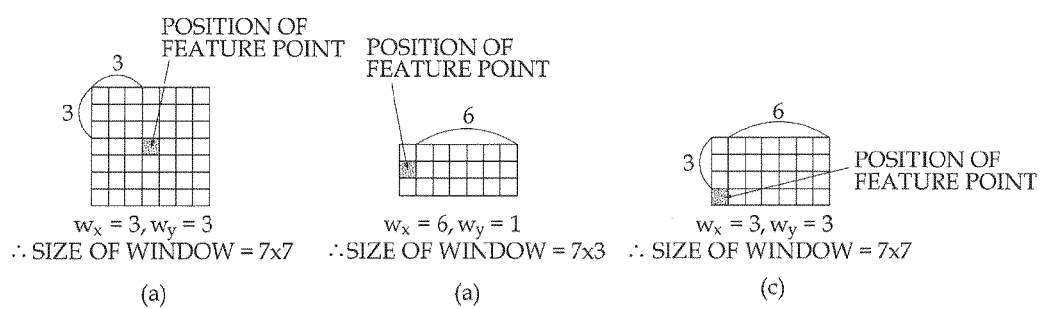
FIG. 8 is a diagram showing an example of a size and a shape of an optical flow calculation window according to previous information.

FIG. 8 is a diagram showing an example of a size and a shape of an optical flow calculation window according to previous information.

Generally, $w_x$ and $w_y$ described above configure a feature point tracking window as show in FIG. 8A. When a comparison camera is positioned at the right as compared to a reference camera, a properly tracked result will be always positioned at the right. In this case, when a size of a window is determined, it may be modified so that detection toward the left may not be performed, as shown in FIG. 8B. When a baseline distance between two cameras is known, equations may be heuristically modified so that a tracking distance becomes excessively distant. Likewise, when the comparison camera is disposed at a position higher than that of the reference camera, the size of the window may be modified so that the tracking is not performed in a downward direction, as shown in FIG. 8C. That is, it is possible to implement an optimal feature-based stereo matching method even by minimum previous information.

In addition, an asymmetrical method of selecting the feature points in the reference image and then tracking the same positions in the comparison image may be used as described above. However, unlike this, a symmetric method of finding the feature points in both of the images and then tracking them in the different images using the optical flow method may also be used.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A three dimensional (3D) motion recognition method through feature-based stereo matching, comprising:
   obtaining a plurality of images from a plurality of cameras;
   extracting feature points from a single reference image;
   and comparing and tracking the feature points of the reference image and another comparison image photographed at the same time using an optical flow method;

wherein the optical flow method is capable of modifying a size and a shape of a window used in the optical flow method by using previous information.

2. The method of claim 1, wherein the plurality of cameras include a reference camera obtaining the reference image and a comparison camera obtaining the comparison image.

3. The method of claim 1, wherein the comparing of the feature points includes gradually reducing a resolution of the obtained image to create multiple levels of resolution and performing comparison from an image having the lowest resolution.

4. The method of claim 1, wherein the comparing of the feature points may be performed by comparing the feature points of the reference image and the comparison image using gradient distribution in the vicinity of the feature points.

5. The method of claim 1, wherein the comparing and tracking the feature points includes configuring a depth map according to an optical flow distance and comparing and tracking the feature points of the configured depth map.

6. The method of claim 1, wherein the optical flow method is configured to find the feature points in each of the reference image and the comparison image, and track the feature points by applying the optical flow method in each direction.

7. The method of claim 1, wherein the tracking the feature points further includes removing noise by using a motion template method in which an area that has movement is represented by a bright color and an area that does not have movement is represented by a dark color.

8. A three dimensional (3D) motion recognition apparatus in an image processing apparatus through feature-based stereo matching, comprising:
    a plurality of cameras obtaining a plurality of images;
    a feature point extracting unit extracting feature points in a single reference image;
    a feature point comparing and extracting unit comparing and tracking the feature points of the reference image and another comparison image photographed at the same time using an optical flow method;
    wherein the feature point comparing and extracting unit is capable of modifying a size and a shape of a window used in the optical flow method by using previous information.

9. The apparatus of claim 8, wherein the feature point comparing and extracting unit compares the feature points of the reference image and the comparison image using gradient distribution in the vicinity of the feature points.

10. The apparatus of claim 8, wherein the feature point comparing and extracting unit configures a depth map according to an optical flow distance and compares and tracks the feature points of the configured depth map.

11. The apparatus of claim 8, wherein the feature point comparing and extracting unit removes noise by using a motion template method in which an area that has movement is represented by a bright color and an area that does not have movement is represented by a dark color.

\* \* \* \* \*